(No Model.)
E. E. PARK.
FLOWER PIN.
No. 547,181. Patented Oct. 1, 1895.
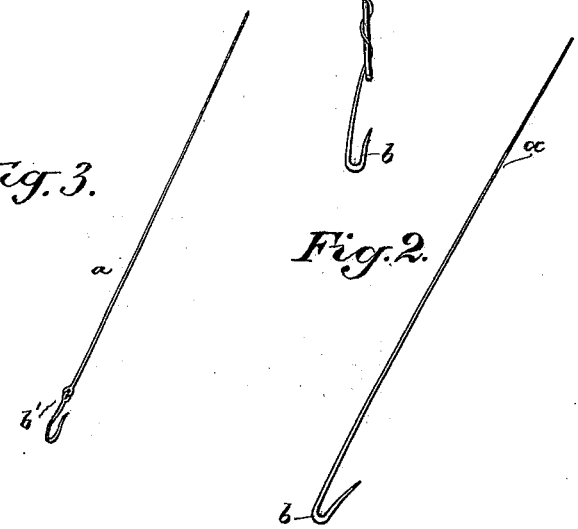
Witnesses:
Inventor,
Edward E. Park
By Dewey & Co.
Attys

UNITED STATES PATENT OFFICE.

EDWARD E. PARK, OF SAN FRANCISCO, CALIFORNIA, ASSIGNOR OF ONE-HALF TO JOHN W. DAVIS, OF SAME PLACE.

FLOWER-PIN.

SPECIFICATION forming part of Letters Patent No. 547,181, dated October 1, 1895.

Application filed May 14, 1895. Serial No. 549,317. (No model.)

*To all whom it may concern:*

Be it known that I, EDWARD E. PARK, a citizen of the United States, residing in the city and county of San Francisco, State of California, have invented an Improvement in Flower-Pins; and I hereby declare the following to be a full, clear, and exact description of the same.

My invention relates to a device which is designed for securing flowers, boutonnières, and for other purposes for which such a device can be used.

It consists of a wire adapted to secure the article, and having a hook by which it may itself be secured.

In the accompanying drawings, Figure 1 shows the application of the pin to hold a flower. Fig. 2 is a view of one form of my device. Fig. 3 is a modification to be referred to.

For the purpose of securing boutonnières it is customary to place the stem of the flower through a buttonhole of the coat and afterward secure the stem upon the other side of the lapel by ordinary pins. The stems of these flowers are very apt to become broken, leaving only the flower itself, which is then worthless and must be discarded, as there is no means of holding it.

My device consists of a slender flexible wire $a$, having one end sufficiently pointed, so that it may be inserted through the stem or through the base of the flower close up to the flower itself and then bent so as to prevent its being pulled out. The wire is of sufficient length, so that it may be wound around the stem as many times as may be desired, and at the opposite end the wire is formed into a hook $b$ of sufficient stiffness to allow it to be hooked into the cloth beneath the lapel and thus hold the flower in place. By this arrangement the flower is held by reason of the point of the pin passing through it and being folded down, and the coil of the wire around the stem tends to prevent the latter being broken off; but if it should become broken the wire itself will sustain the flower and prevent its being lost. It will be manifest that the pin may be made with more than one stem or more than one hook, if desired, for the purpose of a more secure fastening; but this would be a mere duplication of parts. The hook portion is made of wire sufficiently thick to retain its position and rigidity, and the wire is drawn down from this to a very slender and flexible form, so that it can be easily inserted through the stem or base of the flower and afterward coiled around.

It will be manifest that the wires and hooks can be made in one piece, or they may be made separate and united by a swivel or other joint, as shown at $b'$.

Having thus described my invention, what I claim as new, and desire to secure by Letters Patent, is—

1. A holding device for flowers and other articles consisting of a pin or wire having a point which may be inserted through the body or stem of the flower, a flexible body which may be coiled around it, and a thickened or stiffened pointed hook at the opposite end by which it may be permanently attached.

2. A holder for flowers and other articles consisting of a flexible pin or wire pointed at one end having the opposite end thickened and bent into a hook shape and pointed.

3. As an article of manufacture a holder for flowers consisting of a stiff hook from which extends a flexible metallic body adapted to be spirally wrapped around the article to be held.

In witness whereof I have hereunto set my hand.

EDWARD E. PARK.

Witnesses:
S. H. NOURSE,
J. A. BAYLESS.